(12) United States Patent
Vetrovec

(10) Patent No.: US 6,562,225 B2
(45) Date of Patent: May 13, 2003

(54) CHEMICAL OXYGEN-IODINE LASER WITH ELECTROCHEMICAL REGENERATION OF BASIC HYDROGEN PEROXIDE AND CHLORINE

(75) Inventor: Jan Vetrovec, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/057,587

(22) Filed: Jan. 25, 2002

(65) Prior Publication Data

US 2003/0019757 A1 Jan. 30, 2003

Related U.S. Application Data

(63) Continuation of application No. 09/385,178, filed on Aug. 30, 1999, now abandoned.

(51) Int. Cl.[7] .............................................. C25B 1/30
(52) U.S. Cl. ..................... 205/466; 205/466; 205/468
(58) Field of Search ........................ 205/466, 468, 205/618

(56) References Cited

U.S. PATENT DOCUMENTS 4,118,305 A    10/1978   Oloman et al.
4,267,526 A    5/1981    McDermott et al.
4,511,441 A    4/1985    McIntyre et al.
4,921,587 A    5/1990    Dong et al.
4,927,509 A    5/1990    Mathur et al.
4,969,981 A    11/1990   Rogers et al.
5,624,654 A    4/1997    Clendening, Jr. et al.
6,004,449 A    12/1999   Vetrovec

OTHER PUBLICATIONS

No month Vetrovec, John (1997). "Regeneration of Basic Hydrogen Peroxide and Chlorine for Use in Chemical Oxygen–Iodine Laser." Rocketdyne Division of Boeing North American, Inc., 1–9.

Primary Examiner—Arun S. Phasge
(74) Attorney, Agent, or Firm—Harness Dickey & Pierce P.L.C.

(57) ABSTRACT

A continuous use chemical oxygen iodine laser requires a continuous supply of basic hydrogen peroxide and chlorine to produce singlet delta oxygen for the laser. Regeneration of the spent basic hydrogen peroxide and chlorine with the input of oxygen and electricity can be generated on site or be obtained from a power grid. The regeneration of the spent basic hydrogen peroxide and chlorine makes continuous use of a chemical oxygen iodine laser possible without the constant resupply of basic hydrogen peroxide from an outside source.

9 Claims, 3 Drawing Sheets

CHEMICAL OXYGEN-IODINE LASER WITH ELECTROCHEMICAL REGENERATION OF BASIC HYDROGEN PEROXIDE AND CHLORINE

This application is a continuation of U.S. Ser. No. 09/385,178 filed Aug. 30, 1999, now abandoned.

FIELD OF THE INVENTION

This invention relates to in-situ electrochemical regeneration of alkaline hydrogen peroxide and chlorine for a continuously operating chemical oxygen-iodine laser, which can be used for high energy material processing applications.

DESCRIPTION OF THE RELATED ART

Prior art has established that COIL (Chemical Oxygen-Iodine Laser) is capable of delivering a high power laser beam with excellent beam quality and at a wavelength compatible with optical fibers. These characteristics make COIL a candidate for a variety of industrial applications in material processing, where high power, high-brightness, and beams delivered by optical fiber can provide economic and/or technological advantages over existing industrial lasers such as carbon dioxide ($CO_2$) and Nd:YAG lasers. High-brightness lasers with 10–25 kW power can improve existing laser oriented industrial processes and can facilitate development of certain emerging applications such as aluminum cutting and welding, thick section cutting for dismantlement of nuclear installations, laser driven x-ray lithography, and pulsed laser vapor deposition.

In COIL the laser power is produced by extraction of energy from a flow of excited gas produced by reaction of chemical fuels. Sustaining continuous operation, such as required for many industrial and government applications in material processing, requires a continuous flow of fuel must be provided. In prior art, fresh fuel obtained from commercial suppliers was used to operate COIL. However, the costs associated with providing fresh fuel and disposing of reaction products make use of COIL for industrial applications uneconomical and have been a leading impediment to developing commercially useful COIL devices.

Laser power in COIL is derived from chemical energy released by reacting Chlorine gas and Basic (alkaline) Hydrogen Peroxide (BHP), an aqueous solution of hydrogen peroxide and potassium (or sodium) hydroxide, to generate singlet oxygen which produces and excites atomic iodine to a laser transition (disclosed by McDermott in U.S. Pat. No. 4,267,526). In prior art, BHP was prepared by mixing highly concentrated solutions of hydrogen peroxide and potassium hydroxide obtained from commercial suppliers. Chlorine was also commercially obtained in a form of liquefied gas. The by-product of the BHP reaction with chlorine, namely aqueous solution of potassium chloride (which normally includes some unreacted BHP) was disposed of as a hazardous waste.

Using raw fuels in this manner to operate COIL on a continuous basis has several disadvantages. First, raw fuels are relatively expensive and their continuous supply requires significant logistics. Highly corrosive nature of the fuels requires significant safety precautions during their transport, handling and storage. Similar considerations apply to disposal of reaction by-products. In addition, due to thermal decomposition of peroxyl anions BHP has a short shelf life which precludes maintaining a large inventory for use with COIL.

Typical COIL systems operate with a predetermined quantity of BHP liquor that is continuously recirculated within the system and reacted with chlorine gas. During each contact with chlorine some of the peroxyl and hydroxyl anions in the BHP are depleted in a reaction which generated singlet oxygen as the primary product, singlet oxygen is separated as gas, and salt and water as secondary products that become a part of the recirculating BHP liquor. The reaction thus reduces concentration of peroxyl and hydroxyl anions in the liquor, increases liquor volume by addition of water, and increases its salt content.

COIL systems have been operated wherein the entire quantity of BHP required to sustain limited time operation was prepared in advance and the laser operated until the BHP concentration was reduced to the point at which the laser would no longer function efficiently, at which time the residual BHP liquor was drained and replaced with fresh liquor.

Other COIL systems have been proposed where the quantity of BHP liquor continuously recirculates within the system and reacting with chorine. The system is continuously provided with chlorine as well as fresh highly concentrated hydrogen peroxide and potassium hydroxide while removing water and potassium chloride salt. This method maintains a proper concentration of peroxyl and hydroxyl anions in the BHP liquor and allows continuous operation of a COIL laser.

In either case fresh chemical fuel required to operate the laser, namely hydrogen peroxide, potassium hydroxide, and chlorine fuel must be provided from external sources and the reaction byproducts disposed of in an environmentally safe manner. Thus a continuous operation of COIL in this fashion necessitates significant monetary expense and logistical support.

SUMMARY OF THE INVENTION

The invention is for electrochemical regeneration of Basic Hydrogen Peroxide. (BHP) and chlorine for use in a Chemical Oxygen-Iodine Lasers (COIL). Depleted (reduced peroxyl strength) BHP from the singlet delta oxygen generator is recycled through an electrochemical cell which simultaneously regenerates BHP to its full strength and produces chlorine, both for use in the singlet delta oxygen generator.

The electrochemical regenerator cell has two compartments separated by a cation-exchange membrane. In the anode compartment chlorine is produced by electrolysis of potassium chloride and in the cathode compartment peroxyl and hydroxyl anions are produced by electrosynthesis of water and oxygen. In this fashion the electrochemical cell essentially reverses the singlet delta oxygen-producing reaction between BHP and chlorine by reconstituting the original reactants. Electrochemical regeneration of BHP and chlorine allows the COIL system to operate only on electricity and atmospheric oxygen without external source of hydrogen peroxide, potassium hydroxide, and chlorine.

The use of such a regenerative system would reduce or eliminate the need to supply external sources of reactants for use in a COIL. This would reduce the time and energy used to supply such elements and the space necessary to inventory such elements for use in a COIL. Additionally, this would also reduce the cost of a COIL since only an initial external supply of reactant elements is necessary which are then regenerated within the system itself. Finally, this would also significantly reduce the amount of hazardous material produced by a COIL laser.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
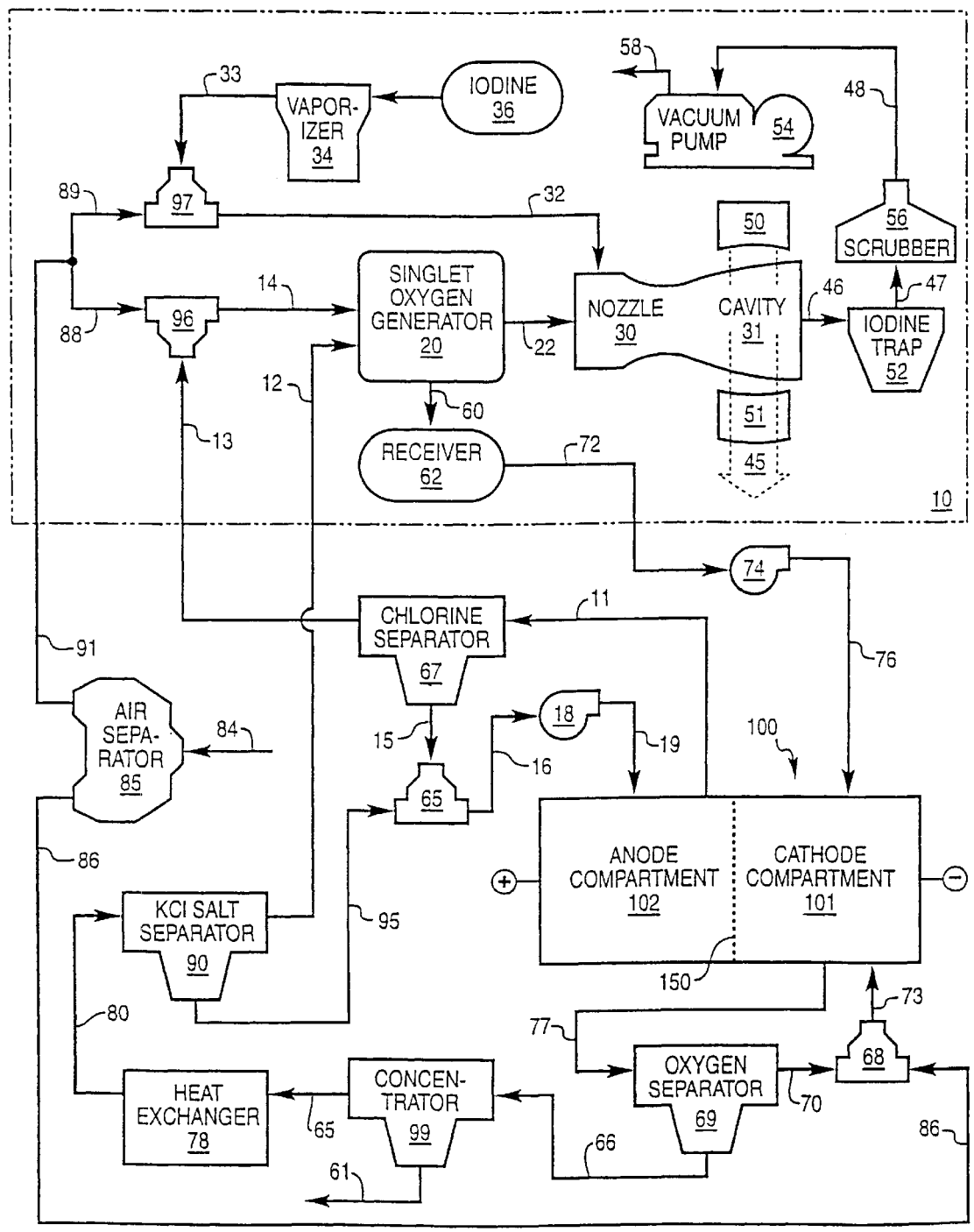
FIG. 1 shows a schematic of a chemical oxygen iodine laser with the preferred configuration of the chlorine and basic hydrogen peroxide regeneration equipment.

In reference to FIG. 1, a Chemical Oxygen-Iodine Laser (COIL) 10 uses a continuous reaction of Basic Hydrogen Peroxide (BHP) 12 and a mixture of chlorine and nitrogen gas 14, which is supplied to a singlet oxygen generator 20 to produce excited oxygen gas in a metastable state known as the singlet delta oxygen ($O_2(^1\Delta)$). The $O_2(^1\Delta)$ leaves the singlet oxygen generator 20 in line 22 and is mixed in a nozzle 30 with a continuous supply of iodine vapor entrained in nitrogen from line 32. The iodine vapor supplied to the nozzle 30 is stored in a solid or liquid form in a reservoir 36 and is vaporized in iodine vapor generator 34. The iodine vapor fed in line 33 is mixed with nitrogen from line 89 in mixer 97 and the mixture is carried in line 32 to nozzle 30. This process facilitates an energy transfer from the $O_2(^1\Delta)$ to the iodine in nozzle 30, by dissociating iodine molecules into atoms and bringing the iodine atoms to an electronically excited state known as $^2P_{1/2}$. Using a suitable laser cavity 31 with an optical resonator comprising mirrors 50 and 51 a beam of coherent laser light 45 can be extracted from the inverted population of the exited iodine atoms as shown in a process disclosed by McDermott in U.S. Pat. No. 4,267,526. During this process the excited iodine atoms decay from a high energy state $^2P_{1/2}$ to a lower energy state $^2P_{3/2}$ while releasing photons at a 1.315 micrometer wavelength.

In order to improve laser performance, nitrogen gas, which does not take part in any reactions here and is used only as a diluent, is added to the chlorine gas and to the iodine vapor. Line 91 which is the nitrogen outlet of the air separator 85 branches out to line 88 and 89 which feed nitrogen gas to mixers 96 and 97. The mixer 96 receives and mixes nitrogen 88 and chlorine 13 and feeds the mixture through line 14 to the oxygen generator 20. The mixer 97 receives and mixes nitrogen 89 and iodine vapor 33 and feeds the mixture of nitrogen and iodine vapor through line 32 to the COIL nozzle 30. Additional nitrogen purge gas may be added to the flow in laser cavity 31 to protect optical components.

The flow of gas containing oxygen, iodine, diluent and unreacted chlorine in line 46 from laser cavity 31 to iodine trap 52, wherein most of the iodine vapor is separated from the flow by condensation and collected for eventual reuse in the system. Unreacted chlorine and a residual trace amount of iodine are removed from the flow in a scrubber 56 by reacting the feed from line 47 with an aqueous solution of suitable reactive chemicals (e.g. mixture of potassium hydroxide, potassium iodide, and sodium thiosulfate). This process assures that, system effluents do not constitute environmental and safety hazards. Gas flow 48, free of iodine and chlorine, is fed into a vacuum pump 54 and exhausted through line 58 into the atmosphere.

Continuous regeneration of chemicals expended in the oxygen generator 20 is accomplished by recirculation of the BHP electrolyte between the oxygen generator 20 and the regeneration cell 100. The BHP is an aqueous electrolyte containing $O_2H^-$, $OH^-$, and $Cl^-$ anions and $K^+$ cations and possibly solid KCl. The strength of $H_2O_2$ in fresh BHP liquor is approximately 12% by weight and the molar ratio of KOH and $H_2O_2$ is about 1.0. It should be noted that concentrations of KOH and $H_2O_2$ are strongly influenced by the performance of the peroxide producing cathode. The actual concentration of BHP electrolyte varies along the recirculation loop. In particular, the $O_2H^-$ and $OH^-$ anions are depleted and $Cl^-$ anions are added in the oxygen generator 20. Conversely, $O_2H^-$ and $OH^-$ anions are added and $Cl^-$ anions are depleted in the regeneration cell 100. In this process, the regeneration cell 100 reconstitutes BHP liquor to its original composition and generates chlorine gas by reversing the reaction taking place in the oxygen generator 20.

The singlet oxygen generator 20 takes in $Cl_2$ mixed with nonreactive nitrogen 14 and fresh (higher $O_2H^-$ concentration) BHP liquor 12 and reacts these for the purpose of generating singlet oxygen according to the reaction:

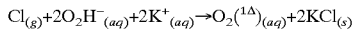
$$Cl_{(g)} + 2O_2H^-_{(aq)} + 2K^+_{(aq)} \rightarrow O_2(^1\Delta)_{(aq)} + 2KCl_{(s)}$$

During this process most of the chlorine gas (about 99%) and only few percent of the $O_2H^-$ anions delivered to the oxygen generator 20 are actually reacted. Mixture of singlet delta oxygen, nitrogen diluent, and unreacted chlorine is carried in line 22 out of the oxygen generator 20. Unreacted $O_2H^-$ anions together with reaction products. $H_2O_2$ and KCl are contained in the spent (reduced $O_2H^-$ concentration) BHP is directed through line 60 into the receiving tank 62. The receiving tank 62 acts as a surge tank for a pump 74 which receives depleted BHP in line 72 and pumps the liquor BHP in line 76 to the cathode compartment 101 in the regeneration cell 100.

The regeneration cell 100 has two compartments 101 and 102 separated by a cation exchange membrane 150. The cathode compartment 101 employs a cathode for electrosynthesis of $O_2H^-$ and $OH^-$ anions from oxygen and BHP electrolyte. Gaseous $O_2$ from oxygen output of an air separator 85 fed in line 86 is combined with a flow of excess oxygen 70 from oxygen separator 69 in mixer 68 and provided in oxygen feed line 73 to cathode compartment 101. The air separator 85 is a commercial unit which receives atmospheric air 84 and separates it into relatively pure oxygen in line 86 and relatively pure nitrogen in line 91 using well known processes such as pressure-swing adsorption or membrane diffusion.

The cathode receives depleted BHP liquor provided into the cathode compartment 101 through line 76 and oxygen provided through line 73. The cathode has a porous, high surface area and it is of the type as used in industry for electrosynthesis of alkaline hydrogen peroxide from the aqueous solution of sodium hydroxide and oxygen. The porous nature of the cathode provides a large contact surface between the electrolyte and oxygen gas which allows oxygen gas, thereby allowing efficient reaction. With an application of electric current the cathode synthesizes oxygen and water contained in the electrolyte into alkaline (basic) peroxide following the reaction.

$$O_2 + 2H_2O + 2e^- \rightarrow O_2H^-_{(aq)} + OH^-_{(aq)}$$

Figure 4:
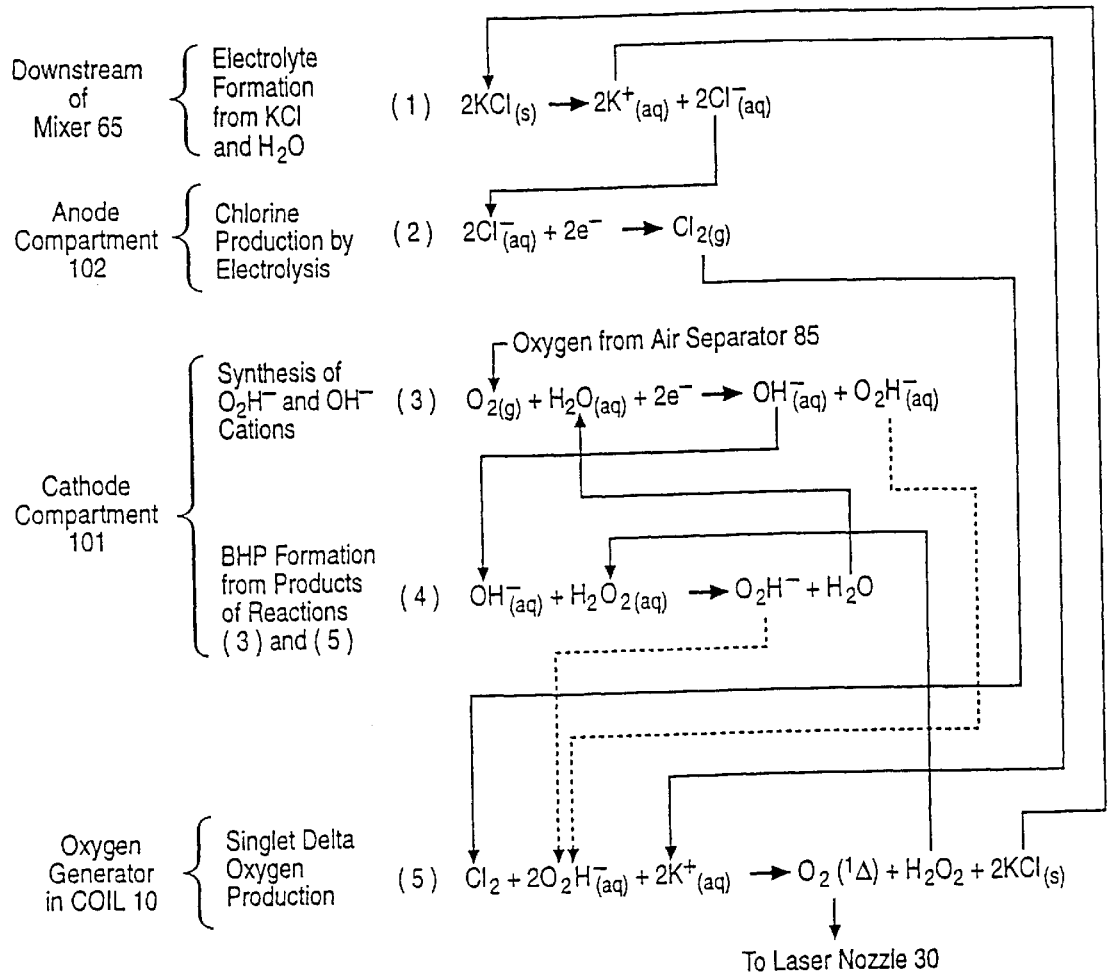
FIG. 4 shows a flow diagram for the regeneration of basic hydrogen peroxide and chlorine and a list of chemical reactions.

(see equation 3 in FIG. 4)

The OH$^-$ anion reacts with H$_2$O$_2$ previously added to the electrolyte in the singlet oxygen generator 20 (see equation 5 in FIG. 4) to produce another O$_2$H$^-$ anion and water molecule according to $$OH^-(aq) + H_2O_2 \rightarrow O_2H^- + H_2O$$

(see equation 4 in FIG. 4)

The regenerated BHP liquor (i.e. with increased O$_2$H$^-$) concentration is transported out of the cathode compartment 101 in line 77 to a separator 69 where entrained excess oxygen is separated from the liquid. Separated excess oxygen is then returned in line 70 to mixer 68 where it is added to the flow of fresh oxygen 86 and fed in line 73 to the cathode compartment 101. A stream of BHP liquor 66 from the separator 69 is directed to concentrator 99 where excess water is removed from the BHP liquor and discharged through line 61. Concentrated BHP liquor is transported in line 65 to heat exchanger 78 where the BHP liquor is cooled and sent in line 80 to salt separator 90. Cooling the BHP liquor removed the heat added to the liquor in the oxygen generator 20 and the electrolytic cell 100 forces excess KCl out of the solution. The salt separator 90 removes KCl solids from the BHP liquor. BHP liquor free of KCl particles is then transported in line 12 back into the singlet oxygen generator 20, thereby completing a full pass through the recirculation loop.

The KCl solids removed from the BHP liquor in salt separator 90 are transported in line 95 to the mixer 65 where the KCl is mixed with deleted anolyte liquor fed in line 15 from chlorine separator 67. The anolyte liquor is an acidic aqueous solution of KCl which is recirculated by pump 18 in a closed loop fashion. KCl dissolves in the anolyte liquor and is ionized as $$2KCl_{(s)} \rightarrow 2K^+_{(aq)} + 2Cl^-_{(aq)}$$

(See equation 1 of FIG. 4)

Anolyte liquor replenished with KCl is transported in line 16 to pump 18 which pumps anolyte -liquor into anode compartment 102 of the regeneration cell 100. In the anode compartment 102 a conventional anode electrode as used in the chlor-alkali industry generates chlorine gas according to $$2Cl^-(aq) - 2e^- \rightarrow Cl_2(g)$$

(See equation 2 of FIG. 4)

The chlorine gas generated on the anode is entrained in the flow of depleted anolyte and transported from the anode compartment 102 in line 11 to a gas-liquid separator 67 where chlorine gas is separated from the anolyte liquor. Separated chlorine gas is them transported in line 13 to mixer 96 to combine it with nitrogen from line 88. The mixed nitrogen and chlorine is directed through line 14 to singlet oxygen generator 20, thereby completing a full pass through the recirculation loop. Depleted anolyte liquor largely free bf entrained chlorine gas is returned in line 15 from separator 67 to mixer 65 where KCl slurry from line 95 is mixed into the flow. The mixture is provided in line 16 to pump 18 which returns the anolyte through line 19 back into the chlorine compartment 102. KCl solids mixed into the flow by mixer 65 become dissolved as the anolyte is being returned to the chlorine compartment 102 of cell 100. Potassium cations K$^+$(aq) produced in the anolyte by dissolving KCl solids are returned back into the BHP electrolyte by diffusing from the anolyte into the catholyte through the cation exchange membrane 150.

The cation exchange membrane 150 can be of the perfluorinated type such as the Nafion® family (Nafion is a registered trademark of DuPont). The membrane 150 thus allows K$^+$ cations to be transported from the anode compartment 102 to the peroxide cathode 101 thereby returning K$^+$ cations into the BHP electrolyte. At the same time the membrane 150 blocks the transport of OH$^-$ and O$_2$H$^-$ anions from the cathode compartment 101 into the anode compartment 102. In order to prevent thermal decomposition of BHP both the cathode compartment 101 and anode compartment 102 are operated at a temperature near zero degrees Centigrade.

The anode is preferably made of graphite to avoid possible contamination of BHP by heavy metal ions transported across the membrane 150. Alternate material for the anode is titanium and coated with a suitable chlorine evolution catalyst. This type of corrosion resistant anode is known in the industry as a Dimensionally Stable. Anode or DSA® (DSA is a registered trademark of Diamond Shamrock Technologies S.A.) and it is commonly used in commercial chlor-alkali cells. When the DSA anode is used, precautions must be taken to avoid accumulation of heavy metal ions within the BHP liquor.

Figure 2:
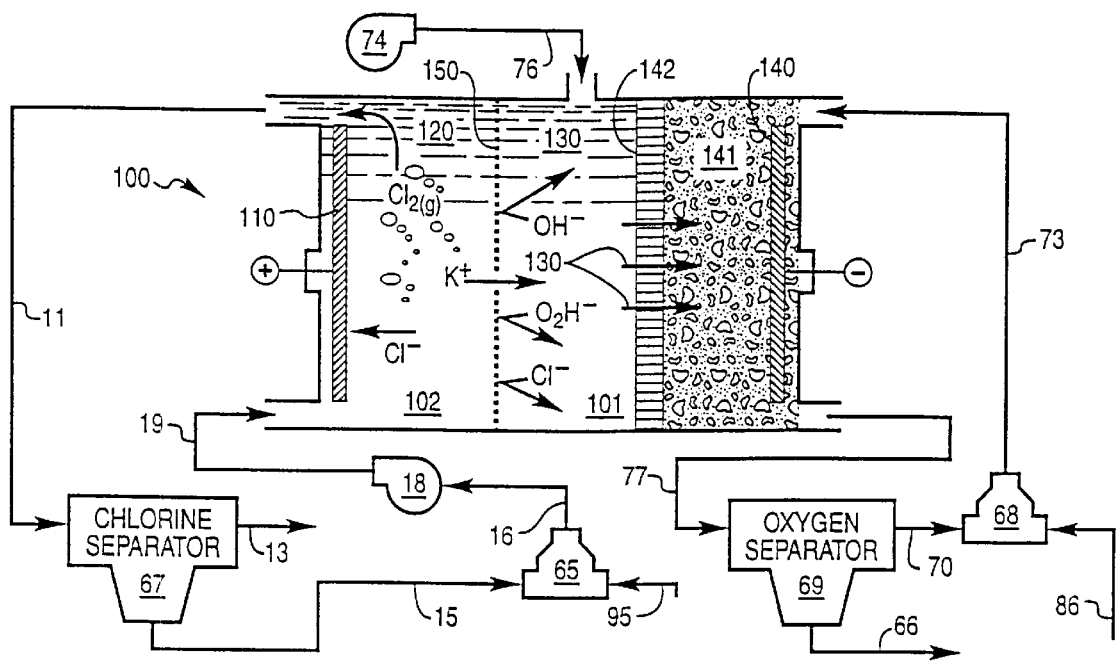
FIG. 2 shows details of the electrolytic regeneration cell with packed bed cathode.

FIG. 2 shows an alkaline peroxide cell 100 with a preferred configuration of cathode compartment 101. The cathode 141 is a porous, packed bed, self-draining mass, fed by catholyte 130 seepage through a liquid permeable separator-type diaphragm 142 and drained through the packed bed. The packed bed is made of graphite particle coated with a mixture of carbon black and polytetrafluorethylene. This type of cathode was developed by Dow Chemical Company for electrosynthesis of alkaline hydrogen peroxide from oxygen and water in aqueous solution of sodium hydroxide electrolyte (see U.S. Pat. Nos. 4,511,441 and 4,921,587).

Depleted BHP liquor from line 76 is introduced between the cation exchange 150 and the liquid permeable diaphragm 142, and flows through the diaphragm 142 into the porous packed bed cathode 141. The purpose of the liquid permeable diaphragm 142 is to assure uniform flow distribution of the BHP electrolyte 130 entering the porous packed bed cathode 141. Oxygen feedstock 73 is provided at the top of the porous, packed bed cathode 141 where is diffuses throughout the packed bed and dissolves in the BHP electrolyte 130 within the cathode. On the passage of electric current introduced to the cathode 141 by means of the current distributor 140, oxygen and water in the electrolyte react in a previously described manner. (See equation 3 of FIG. 4), Regenerated BHP electrolyte is drained at the bottom of the porous, packed bed cathode 141 into line 77. Suitability of the porous, packed bed, self-draining cathode for production of a concentrated basic hydrogen peroxide in electrolyte containing potassium hydroxide has been experimentally established. The cell 100 also contains anode 110 and anolyte liquor whose functions have been already described.

Figure 3:
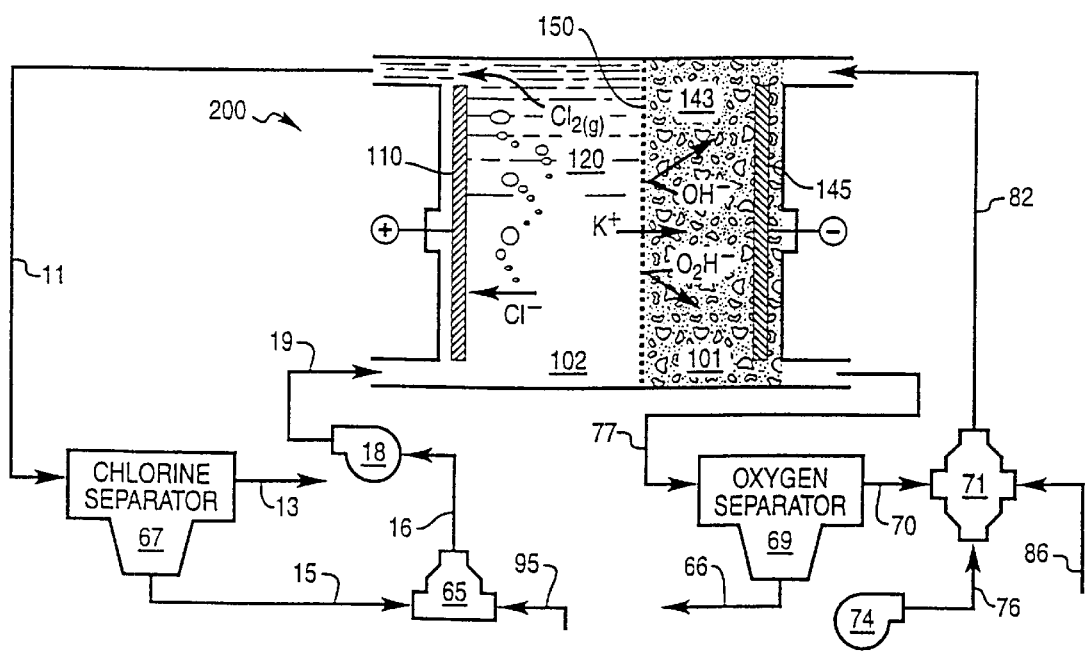
FIG. 3 shows details of the electrolytic regeneration cell, trickle flow cathode.

FIG. 3 shows a second embodiment of an alkaline peroxide cell 200 with the alternate configuration of a cathode compartment 101. The cell 200 uses a trickle flow type packed bed cathode 143 which has been previously used for electrosynthesis of alkaline hydrogen peroxide (see U.S. Pat. No. 4,118,305). The packed bed cathode 143 is made of graphite particles and is backed by a cathode plate 145. Depleted BHP liquor flowing in line 76 is first mixed in a mixer 71 with oxygen gas fed from the air-separator 85 provided by line 86 and excess oxygen returned in line 70. The stream of BHP liquor with diffused oxygen bubbles in line 82 is directed into the packed bed cathode 143 where, owing to the high surface area of the bed, oxygen is dissolved in the BHP electrolyte and, upon passage of electrical current, reacted with the electrolyte. The mixture of regenerated BHP and unreacted oxygen gas if fed in line 77 from the cathode compartment 101 to oxygen separator 69 where oxygen gas is removed from the electrolyte and recycled into the mixer 71. Regenerated BHP free of oxygen bubbles is fed in line 66 to the concentrator 99.

FIG. 4 shows the balance of the recirculating species and the reactions occurring in the loop. Equation 5 shows the reaction in the singlet delta oxygen generator 20 where chlorine gas is used to react with peroxyl anions in BHP electrolyte to produce singlet delta oxygen, hydrogen peroxide and potassium chloride.

The potassium chloride from equation 5 is used to replenish the anolyte liquor in the mixer 65 as shown by equation 1 in FIG. 4. Equation 2 shows how the chlorine gas is produced on anode 110 by electrolysis of the anolyte 120. Potassium cations are transported out of the anolyte 120 and through the cation exchange membrane 150 into the BHP electrolyte 130 in the cathode compartment 101 from there they are carried by the BHP flow into the oxygen generator 20 and there they participate in formulation of KCl (equation 5).

The hydrogen peroxide produced by the reaction in the oxygen generator 20 (equation 5) is used to form peroxyl anion from the hydroxyl anion (equation 4) produced by the cathodic process (equation 3).

Thus a closed loop for regeneration of BHP and chlorine is presented where the, chemical energy released to COIL 10 is replaced by the addition of electricity from an outside source and the oxygen vented to atmosphere 56 is replaced by an atmospheric oxygen 86 added to the cathode. Nitrogen diluent vented from the system through line 58 is replenished by atmospheric nitrogen 91 provided by an air separation unit 85 which is also a source of oxygen 86 for the cathode compartment 101.

When continuously operating the COIL laser 10 with the regeneration loop, all processes must be balanced to assure proper production and flow of all species. In particular, cation exchange membranes are known to "pump" water from anolyte 120 to catholyte 130. In order to avoid the chlorine compartment 102 running dry and the BHP electrolyte becoming too dilute, water has to be added to the anolyte 120 to compensate for the amount water transported by the cation exchange membrane 150. This is in-part accomplished by allowing the KCl sludge feed line 15 to include a small amount of BHP recirculated loop liquor. Prior to injection into the anolyte 120 the sludge feed must be neutralized with suitable acid in order to maintain the anolyte pH sufficiently low to avoid anodic production of potassium chlorate. Furthermore, a small amount of water from the BHP will evaporate in the oxygen generator 20, and together with a small amount of unreacted chlorine, will be lost from the regeneration system by being entrained in the singlet oxygen stream 46. It is estimated that about 0.1% of water inventory and 0.05% of chlorine inventory will be lost from the system in this manner every hour. Excess water in the BHP loop is removed by the concentrator 99. Water and chlorine monitoring in the system will allow for the injection of water into the recirculating anolyte liquor. Injection of suitable acid is required to maintain the pH of the anolyte. Injection of HCl acid into BHP liquor replenishes chlorine lost from the system and helps to control alkalinity of the BHP liquor.

Operational experience with electrolytic cells for electrosynthesis of alkaline hydrogen peroxide suggests that a small fraction of the $O_2H^-$ anions produced by the cathode is destroyed within the cathode either by thermal decomposition or by parasitic reactions. As a result, the molar ratio of $H_2O_2$ to KOH in the product liquor drained from the cathode is somewhat less than 1, as is theoretically predicted by the reactions in equations 3 and 4 in FIG. 4. Prior art indicates that for optimum operation of COIL, the BHP liquor provide to the oxygen generator 20 should not contain significant concentrations of $OH^-$ anions. This means that the product of the cathodic reduction of oxygen in cell 100 is more alkaline than desired for optimum performance of COIL. One way to handle this situation is to allow the BHP liquor feed into the singlet oxygen. generator 20 to become more alkaline and suffer with the consequential penalty of reduced laser power output of the COIL 10. Improved COIL 10 performance is achieved by raising the ratio of $H_2O_2$ to KOH to at least about 1 through any appropriate method comprising adding a small amount of HCl acid to the BHP product liquor of cell 100 or adding a small amount of neutral $H_2O_2$ to the BHP product liquor of cell 100. Addition of $H_2O_2$ can be accomplished either by injection of commercially available highly concentrated $H_2O_2$ or by flowing the BHP liquor from cell 100 through the middle compartment of a three compartment peroxide generation cell producing neutral peroxide $H_2O_2$ such as that disclosed in the U.S. Pat. No. 4,384,931.

Prior art has established that COIL can operate more efficiently with BHP where most, or all of the hydrogen atoms have been replaced by deuterium (D). The resulting basic deuterium peroxide is thus a solution of $D_2O_2$, KOD and KCl in $D_2O$. However, prior art did not provide for closed loop regeneration of the basic deuterium peroxide such as the process disclosed herein, and a small scale manufacture of $D_2O_2$ and KOD to supply the open-loop system of prior art was not economically feasible. Modification of the process disclosed herein to accommodate production of said basic deuterium peroxide is, therefore, another advantage which said process provides for continuous operation of COIL laser.

Numerous variations and modifications exist to the preferred embodiment described herein. For example, the cell 100 which-produces both $Cl_2$ and BHP in a single hardware unit can be replaced with two separate cells; the first cell for production of $Cl_2$ and KOH, and the second cell for production of BHP using KOH product from the first cell as a feedstock. Said cell for production of $Cl_2$ and KOH is a chlor-alkali cell preferably employing an oxygen cathode to suppress cathodic generation of unwanted hydrogen and to reduce cell voltage. A suitable cell of this type has been disclosed by McIntyre in the U.S. Pat. No. 4,927,509. Alternatively; a conventional chlor-alkali cell with cathodic production of hydrogen can be used. A suitable cell for production of BHP from oxygen and aqueous KOH feedstock is disclosed in U.S. Pat. No. 6,004,449 entitled, "Method of Operating Electrolytic Cell To Produce Highly Concentrated Alkaline Hydrogen Peroxide" to Jan Vetrovec, which is made part hereof and incorporated herein by reference. The BHP product from said cell is then concentrated by removal of water and the concentrate is added to the BHP liquor recirculating through the oxygen generator 20 of the COIL 10. Excess KCl from said recirculating BHP liquor is used as a feedstock in the first cell. The advantage of this variant is that industry standard chlor-alkali cells and modified alkaline hydrogen peroxide cells can be used in lieu of the "combined" cell 100 which requires design and fabrication of new hardware. However, the disadvantages of this variant, namely increased system complexity, increased capital cost, and increased consumption of electrical power appear to outweigh its advantages.

Another class of variants exists wherein the continuous loop of depleted and regenerated BHP is made into semi-continuous or even a discontinuous (batch type) process. While such an arrangement may make it easier to balance the flows and, possibly allow production and accumulation of BHP and $Cl_2$ while the laser is not operating, requirements for additional holding tanks and increased system complexity are deemed to outweigh apparent advantages.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A process for electrochemical regeneration of basic hydrogen peroxide and chlorine for a chemical oxygen iodine laser, comprising:

providing a chemical oxygen iodine laser having a singlet delta oxygen generator consuming basic hydrogen peroxide liquor and chlorine gas to produce singlet delta oxygen gas and depleted basic hydrogen peroxide liquor;

providing a means for electrochemically regenerating said depleted basic hydrogen peroxide liquor into regenerated basic hydrogen peroxide and chloride reactants for use in the chemical oxygen iodine laser;

providing a means for concentrating the regenerated basic hydrogen peroxide, wherein the regenerated basic hydrogen peroxide is concentrated by the removal of water therefrom;

providing a means for delivering the concentrated regenerated basic hydrogen peroxide and chlorine to the chemical oxygen iodine laser thereby forming a loop of depleted and regenerated basic hydrogen peroxide and chlorine for operation of the chemical oxygen iodine laser;

wherein said basic hydrogen peroxide is an aqueous solution of potassium hydroxide, hydrogen peroxide, and potassium chloride;

wherein said depleted basic hydrogen peroxide is a basic hydrogen peroxide with reduced concentration of potassium hydroxide and hydrogen peroxide, and increased concentration of potassium chloride;

wherein said regenerated basic hydrogen peroxide is a basic hydrogen peroxide with increased concentration of potassium hydroxide and hydrogen peroxide, and decreased concentration of potassium chloride over that of said depleted basic hydrogen peroxide;

wherein the regenerated basic hydrogen peroxide has a molar ratio of $H_2O_2/KOH$ at least about 1.

2. The process of claim 1, wherein said basic hydrogen peroxide is replaced by basic deuterium peroxide and wherein said basic deuterium peroxide is comprised of a solution of deuterium peroxide, potassium deuteroxide, and potassium chloride in deuterium oxide.

3. The process of claim 1, wherein regeneration of basic hydrogen peroxide and chlorine is performed simultaneously in at least one electrolytic cell, each said cell having an anode compartment and cathode compartment, said compartments being separated by a cation exchange membrane therebetween; wherein said apparatus for regeneration of said chlorine comprises said anode compartment of said two compartment electrolytic cell;

said apparatus for regeneration of said basic hydrogen peroxide comprises said cathode compartment of said two compartment electrolytic cell;

said anode compartment receiving acidic aqueous solution of potassium chloride and having an anode connected to a source of electricity;

said anode being suitable for electrolytic production of chlorine gas from acidic aqueous solution of potassium chloride;

the cathode compartment receiving the depleted basic hydrogen peroxide liquor and having a cathode connected to a source of electricity;

said cathode having means for receiving depleted basic alkaline electrolyte liquor supplied to said cathode compartment having means for receiving oxygen carrying gas;

said cathode being suitable for electrosynthesis of basic hydrogen peroxide from oxygen and water in a basic aqueous electrolyte;

said cathode having means for discharging regenerated basic hydrogen peroxide; and said cation exchange membrane being capable of transporting potassium cations from said compartment to said cathode compartment.

4. The process of claim 1, wherein regeneration of basic hydrogen peroxide and chlorine is performed individually, each in at least one electrolytic cell, wherein;

said apparatus for regenerating chlorine comprises at least one electrolytic regeneration cell, each said cell having an anode compartment and cathode compartment, said two compartments being separated by cation exchange membrane therebetween;

said anode compartment receiving acidic aqueous solution of potassium chloride and having an anode connected to a source of electricity;

said anode being suitable for electrolytic production of chlorine gas from acidic aqueous solution of potassium chloride;

said apparatus for regenerating basic hydrogen peroxide comprises at least one electrolytic regeneration cell, each said cell having an anode compartment and cycathode compartment, said two compartments being separated by a separator type diaphragm therebetween;

said cathode compartment receiving said aqueous solution of potassium hydroxide from said cathode compartment of said apparatus for regeneration of chlorine;

said cathode compartment and having a cathode connected to a source of electricity;

said cathode having means for receiving said aqueous solution of potassium hydroxide from said cathode compartment of said apparatus for regeneration of chlorine supplied to said cathode compartment and having means for receiving oxygen carrying gas;

said cathode being suitable for electrosynthesis of basic hydrogen peroxide from oxygen and water in a basic aqueous electrolyte; and said cathode having means for discharging regenerated basic hydrogen peroxide.

5. The process of claim 1, further comprising means for separating atmospheric air into a first stream and a second stream;

wherein said first stream contains substantially pure oxygen, wherein said oxygen is employed for the electrochemical regeneration of basic hydrogen peroxide;

wherein said second stream contains substantially pure nitrogen, wherein a portion of said nitrogen is mixed with iodine vapor and provided to the nozzle of said chemical oxygen iodine laser, and a portion of said nitrogen is mixed with said regenerated chlorine and provided to said singlet oxygen generator.

6. The process of claim 1, wherein the means for electrochemically regenerating said depleted basic hydrogen peroxide liquor into regenerated basic hydrogen peroxide and chloride reactants for use in the chemical oxygen iodine laser comprises:

an electrolytic cell for anodic production of chlorine gas according to the reaction $2Cl^-(aq) \rightarrow 2e^- + Cl_2(g)$, said cell having an anode comprised of graphite material with a low concentration of heavy metals;

an electrolytic cell for cathodically producing $O_2H^-$ and $OH^-$ anions by electrosynthesis of oxygen and water in the presence of alkaline electrolyte according to the reaction $O_2(g) + H_2O + 2e^- \rightarrow O_2H^-(aq) + OH^-(aq)$, said cell having a porous, packed bed, self-draining cathode, fed by catholyte seepage through a liquid permeable separator-type diaphragm;

means for precipitating KCl solid from the catholite liquor;

means for dissolving said precipitated KCl solids into the anolyte liquor according to the reaction $2KCl(s) \rightarrow 2K^+(aq) + 2Cl^-(aq)$ prior to its introduction into the anode compartment of the chlorine producing cell;

means for separating chlorine gas entrained in the anolyte liquor leaving the anode compartment of said chlorine producing cell; and means for separating entrained oxygen gas from the catholyte liquor leaving the cathode compartment of said basic hydrogen peroxide producing cell.

7. The process of claim 1, wherein the molar ratio of $H_2O_2/KOH$ of the regenerated basic hydrogen peroxide is maintained by addition of hydrochloric acid.

8. The process of claim 1, wherein the molar ratio of $H_2O_2/KOH$ of the regenerated basic hydrogen peroxide is maintained by addition of highly concentrated hydrogen peroxide.

9. The process of claim 1, wherein the chemical oxygen iodine laser includes means for separating and trapping iodine from the laser cavity exhaust.

* * * * *